United States Patent [19]

Decker

[11] 3,896,337

[45] July 22, 1975

[54] ELECTRONIC FLASH APPARATUS

[75] Inventor: Hans-Heino Decker, Vechelde, Germany

[73] Assignee: Rollei-Werke Franke & Heidecke, Braunschweig, Germany

[22] Filed: Jan. 22, 1974

[21] Appl. No.: 435,582

[30] Foreign Application Priority Data

Feb. 2, 1973 Germany............................ 2305046

[52] U.S. Cl.............. 315/241 P; 315/151; 315/149
[51] Int. Cl. ......................................... H05b 41/30
[58] Field of Search........ 315/149, 241 P, 151, 155, 315/159

[56] References Cited
UNITED STATES PATENTS

| 3,519,879 | 7/1968 | Ogawa................................ 315/151 |
| 3,758,822 | 9/1973 | Wilwerding..................... 315/241 P |
| 3,769,546 | 10/1973 | Pecher et al..................... 315/151 X |
| 3,818,266 | 6/1974 | Vital et al..................... 315/241 P X |

*Primary Examiner*—Nathan Kaufman
*Attorney, Agent, or Firm*—Stonebraker, Shepard & Stephens

[57] ABSTRACT

Electronic flash apparatus which is photo-electrically controlled by the integrated quantity of light reflected from the subject being photographed. When a threshold value is reached, the flash discharge is interrupted. The cathode potential of the photosensitive control element is reduced in accordance with the time change in the voltage prevailing in the control grid, while the control circuit emits an impulse for the purpose of interrupting the flash tube discharge as soon as the cathode potential falls below the control grid potential, which has been reduced to the extent of the ignition voltage.

5 Claims, 1 Drawing Figure

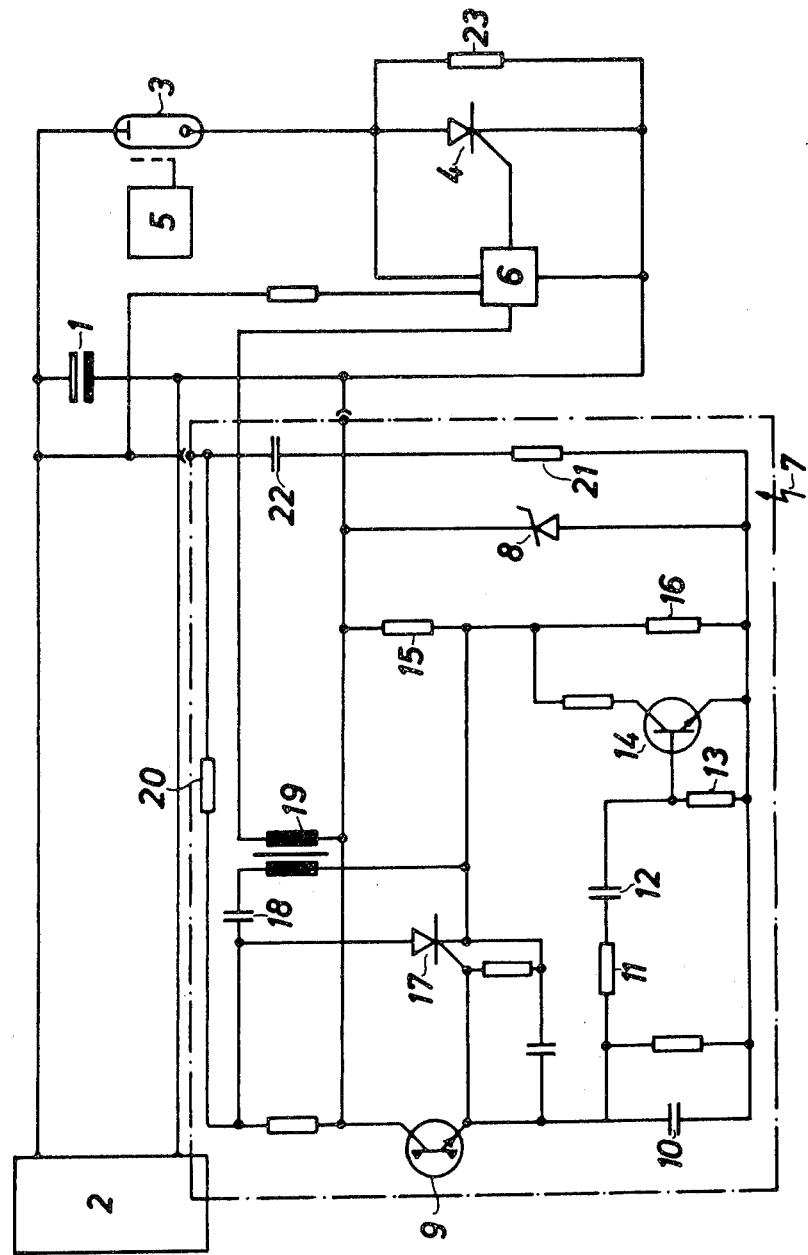

ELECTRONIC FLASH APPARATUS

BACKGROUND OF THE INVENTION

The invention relates to a control circuit for electronic flash apparatus for photographic purposes. Many forms of electronic flash apparatus are known in the art. The flash is ordinarily initiated by closing a switch in synchronism with the operation of the shutter of a photographic camera with which the flash apparatus is used. A light integrating circuit measures the light reflected from the subject being photographed, and when a threshold value is reached, the flash is extinguished. Various arrangements for extinguishing the flash at the proper time are known. For example, there may be an integrating device which is associated with a photosensitive control element and which subjects the control grid of the latter to a voltage corresponding to the time integral of the light flux encountering the switching element.

In control circuits of this kind, it has been found that when there is only a short distance between the camera and the subject, the pictures are often over-exposed, while in the case of long distances from the camera to the subject, the control circuits operate faultlessly. This over-exposure at short distances is due to the fact that between the moment at which the impulse extinguishing the flash tube is emitted by the control circuit, and the moment when the flash tube is actually extinguished, the flash tube emits a certain amount of light. This amount of light differs according to the way in which the discharge is interrupted, but it is present in every case.

In the quench process, when the flash discharge is interrupted by a short circuit parallel to the flash tube, the undesired or excess quantity of light emitted by the flash tube is comparatively small, as the tube current starts to fall off immediately upon establishment of the short circuit, according to an exponential function, with a small time constant. But with the so-called automatic commutation process, using a quenching capacitor, there is a brief increase in the light output of the flash tube, before this too drops away in accordance with an exponential function, the reason for the increase being the charging current which flows through the flash tube in this commutation process. As the control circuit will always emit a signal for the interruption of the flash tube discharge when the light measured by the integrating device has reached the threshold value which is necessary for the correct exposure, it is precisely in the close-up range that the unwanted additional light produced by the flash tube will result in over-exposure, because in the close-up range this unwanted additional light is disproportionately great in relation to the total quantity of light necessary for the exposure.

In order to avoid this over-exposure, it has already been suggested that a control circuit of the kind described above be provided with a "preselection circuit" emitting a signal which depends on the light intercepted by the photosensitive control element and which is added to the signal formed by the integrating device in such a way that an output signal occurs at the output of the control circuit as soon as the sum of these two signals exceeds a certain preselected threshold value. This has been carried out by connecting the control grid of the photosensitive control element to the series circuit consisting of the resistor and the capacitor. Such a control circuit, however, suffers from the drawback that interference impulses are likewise picked up, so that incorrect control operations can not be entirely avoided.

The object of the present invention is to provide an improved control circuit which obviates the above mentioned over-exposure and at the same time operates with maximum freedom from interference.

SUMMARY OF THE INVENTION

The above mentioned object is achieved by designing the circuit so that the cathode potential of the photosensitive control element is reduced in accordance with the time change in the voltage prevailing in the control grid, while the control circuit emits an impulse for the purpose of interrupting the flash tube discharge as soon as the cathode potential falls below the control grid potential, which has been reduced to the extent of the ignition voltage.

In a particularly advantageous manner, the cathode potential of the photosensitive control element is then fixed by a voltage divider circuit of which one resistance is variable in accordance with the time change of the voltage prevailing in the control grid, preferably as a result of the fact that the collector-emitter section of a transistor is situated in parallel with the resistance to be varied, the base-emitter voltage of this transistor corresponding to the time change of the voltage prevailing in the control grid of the photo-sensitive control element.

BRIEF DESCRIPTION OF THE DRAWING

The single view is a schematic wiring diagram of a control circuit according to a preferred embodiment of the invention.

DESCRIPTION OF THE PREFERRED EMBODIMENT

Referring now to the wiring diagram, the storage capacitor 1 is charged up to the operating voltage by any suitable source of direct current, such as a conventional d.c. converter 2. Parallel with the storage capacitor 1, the flash tube 3 is connected in series with the thyristor 4, which controls the flash discharge and which is bridged by a resistor 23 in parallel with the thyristor. The flash tube 3 is ignited by a conventional ignition device schematically shown at 5, usually actuated by closing the synchronous contact switch which, as well understood in the art, is operated in proper timed relation or synchronism to the operation of the shutter of the camera with which this flash apparatus is used. The details of the ignition device are not important for purposes of the present invention, and may be varied within the skill of the art. Merely as an example of one form of ignition device which may be used, reference may be made to Krusche and Rohmann U.S. Pat. No. 3,585,442, granted June 15, 1971, in which see the parts 8, 9, 10, 11, and 12 which together form an ignition device for igniting the flash tube 13 of that patent.

The thyristor 4 of the circuit of the present invention is opened and closed by a control device indicated schematically at 6, which may take the form of the corresponding control device disclosed in the copending U.S. Pat. application of Arthur Schneider, Ser. No. 378,037, filed July 10, 1973, (now abandoned) and owned by the owner of the present application. The signal for the moment at which the thyristor 4 closes is conveyed to the control device 6 of the thyristor by the control circuit of the present invention, indicated in general at 7; that is, the control circuit parts enclosed within the dot-dash rectangle 7 in the wiring diagram.

This control circuit 7 of the present invention is supplied, during the discharge of the storage capacitor 1, with a constant direct voltage stablized via the Zener diode 8. Parallel with the Zener diode there is a photo-transistor 9 and a capacitor 10, the emitter of the photo-transistor 9 being connected to the capacitor. Parallel with this capacitor 10 there is a series circuit comprising the RC member 11, 12 (resistor and capacitor, respectively) and a resistor 13.

A voltage divider circuit consisting essentially of the resistors 15 and 16 is arranged in parallel with the Zener diode 8. The central tap of this voltage divider is connected as shown to the collector of a transistor 14, the collector-emitter circuit of which is parallel to the resistor 16 of the voltage divider. The base of this transistor 14 is connected as illustrated between the capacitor 12 and the resistor 13. The central tap of the voltage divider 15, 16 is also connected to the cathode of a thyristor 17 which is situated in the discharge circuit of a capacitor 18, in series with the primary winding of an ignition transformer 19. The capacitor 18 is connected through the resistor 20 to the positive pole of the d.c. supply from the converter 2. The control grid of the thyristor 17 is connected to the emitter of the photo-transistor 9, and to the capacitor 10. For the supply of current to the control circuit 7, the Zener diode, in series with a resistor 21 and a capacitor 22, is connected in parallel with the storage capacitor 1.

The control circuit of the present invention operates as follows:

When the synchronous contacts of the camera shutter are closed, the ignition device 5 ignites the flash tube 3, which is connected through the resistor 23 to the full operating voltage. Owing to the resulting voltage increase in the thyristor 4, the grid of the thyristor 4 is subjected, by the control device 6, to a positive potential. The thyristor opens (becomes conductive) and the storage capacitor 1, previously charged via the converter 2, can freely discharge through the flash tube 3, creating the illumination necessary for taking the photograph.

The capacitors 18 and 22 have been charged up to the operating voltage at the same time that the main storage capacitor 1 was charged. Owing to the discharge process of the capacitor 22, the terminals of the Zener diode 8 are subjected, in the direction cathode/anode, to a voltage which is kept to a constant value by the Zener diode and which represents the supply voltage of the control circuit. This voltage is divided by the voltage divider circuit, in accordance with the resistance ratio between the resistors 15 and 16, and the voltage drop occurring in the resistor 16 determines the cathode potential of the thyristor 17.

The light emitted by the flash tube 3 is reflected from the subject being photographed and falls on the photo-transistor 9. In accordance with the intensity of this reflected light, a higher or lower current will flow in the collector-emitter circuit of this photo-transistor. A voltage corresponding to the time integral of this current will be generated in the capacitor 10. This voltage determines the potential of the control grid of the thyristor 17. The voltage in the capacitor 10 is differentiated via the RC member 11, 12 and is conveyed to the transistor 14 in the form of a control voltage. According to the magnitude of the time change in the voltage prevailing in the capacitor 10, a higher or lower collector current will flow through the transistor 14. This means that the resistor 16 is reduced in its resistance to a greater or smaller extent, resulting in a change in the voltage decreasing in the resistor 16. This causes the cathode potential of the thyristor 17 to be reduced to a greater or smaller extent likewise. If the value of the cathod potential of the thyristor 17 falls below its control grid potential, reduced to the extent of the ignition voltage of the thyristor, which voltage depends on the type, then the thyristor will cut through. The capacitor 18 discharges across the thyristor 17 and the primary winding of the ignition transformer 19, and generates therein a voltage impulse which is transformed into the secondary winding and which provides the control device 6 with the signal for the blocking of the thyristor 4.

What is claimed is:

1. Electronic flash apparatus comprising a flash tube for emitting photographic light during discharge of the tube, means for interrupting discharge of said tube to stop emission of light therefrom, and integrating means for integrating light reflected from a subject to be photographed and for providing a signal impulse to said interrupting means when the integrated reflected light reaches a desired value, said integrating means including a photosensitive control member 9, 17 having a control grid and a cathode, said integrating means also including circuit means so arranged that the cathode potential of said photosensitive control member is reduced in accordance with the time change in the voltage prevailing in the control grid, and so that said circuit means emits said signal impulse as soon as said cathode potential falls below said control grid potential, which has been reduced to the extent of the ignition voltage, said circuit means including a voltage divider having two resistors 15, 16 one of which (16) is variable in accordance with the time change of the voltage prevailing in the control grid of the photosensitive control member, and wherein the cathode potential of the photosensitive control member is determined by said voltage divider.

2. Apparatus as defined in claim 1, wherein said circuit means includes a transistor 14 having a collector-emitter circuit in parallel with said variable resistor 16, the base-emitter voltage of said transistor 14 corresponding to the time change of the voltage prevailing in the control grid of the photosensitive control member.

3. Apparatus as defined in claim 2, wherein said circuit means includes an integrating capacitor 10 connected to said photosensitive control member, and said circuit means also includes a series circuit parallel to said capacitor 10, said series circuit including the base-emitter section of said transistor 14 and an RC member composed of a resistor 11 and a capacitor 12.

4. Apparatus as defined in claim 3, wherein said photosensitive control member comprises a photo-transistor 9 and a thyristor 17, the control grid of the thyristor 17 being connected to the emitter of the photo-transistor 9 and to said integrating capacitor 10.

5. Electronic flash apparatus comprising a flash tube for emitting photographic light during discharge of the tube, means for interrupting discharge of said tube to stop emission of light therefrom, and control means for controlling operation of said interrupting means, said control means including a photosensitive member responsive to light reflected from a subject being photographed, an integration capacitor charged through said photosensitive member, a thyristor having an anode, a cathode, and a control grid, said thyristor being effective when it becomes conductive in its anode-cathode path to initiate operation of said interrupting means, means connected to said photosensitive member and to the grid of said thyristor for supplying said grid with an increasing potential depending on the integrated quantity of light received by said photosensitive member, means including a voltage divider for determining the potential of the cathode of said thyristor, and means operating in conjunction with said voltage divider for lowering the potential of the cathode of said thyristor in response to a relatively high rate of charging said integration capacitor caused by nearness of said photosensitive member to a subject from which light is reflected, so that an increasing potential supplied to said grid will exceed the potential of said cathode at an earlier time, thus making said thyristor conductive and initiating operation of said interrupting means at an earlier time than if said cathode potential had not been reduced.

* * * * *